C. A. RICHMOND.
DEVICE FOR COMPUTING VALUATIONS OF INVESTMENT SECURITIES.
APPLICATION FILED MAY 19, 1915.

1,157,043.

Patented Oct. 19, 1915.

WITNESS
Channing Whitaker
Draftsman.

INVENTOR
Carl A. Richmond

UNITED STATES PATENT OFFICE.

CARL A. RICHMOND, OF TYNGSBORO, MASSACHUSETTS.

DEVICE FOR COMPUTING VALUATIONS OF INVESTMENT SECURITIES.

1,157,043.  Specification of Letters Patent.  Patented Oct. 19, 1915.

Application filed May 19, 1915. Serial No. 29,252.

*To all whom it may concern:*

Be it known that I, CARL A. RICHMOND, a citizen of the United States, residing at Tyngsboro, in the county of Middlesex and State of Massachusetts, have invented certain new and useful Improvements in Devices for Computing Valuations of Investment Securities, of which the following is a specification.

The principal object of my invention is to provide a new and improved device for computing valuations in connection with bonds and other securities.

Another object of my invention is to provide a simple device for this purpose such that the major part of it can be folded and carried in a coat pocket when not in use.

These and other objects will be made apparent in the following specification and claims.

In the accompanying drawings I have illustrated one specific embodiment of my invention and I proceed to describe the same.

It will be understood that the invention is defined in the appended claims.

Whatever the denominations of bonds or other securities, it is common to quote them on the basis of 100 as par. Thus if the market value of a bond is 82, this means that whatever its denomination (as for example $1000.00 or $5000.00), its market value is 82/100ths of its denomination or face value. Represent this market value as commonly quoted by M, and represent the expressed rate per centum of annual interest borne by the bond as E. That is, E is the number of 100ths in the rate of interest, as $5\frac{1}{2}$ for example. Also, let T stand for the time in years from the present time until the maturity of the bond, and let I stand for the income rate per centum of annual interest that the bond will yield an investor at the market value M. I is the number of 100ths in the income rate, and the income rate is the same as the virtual rate, it is the rate of return on the investment having regard both to the expressed rate E and the deferred payment of the par value of the bond.

Figure 1:
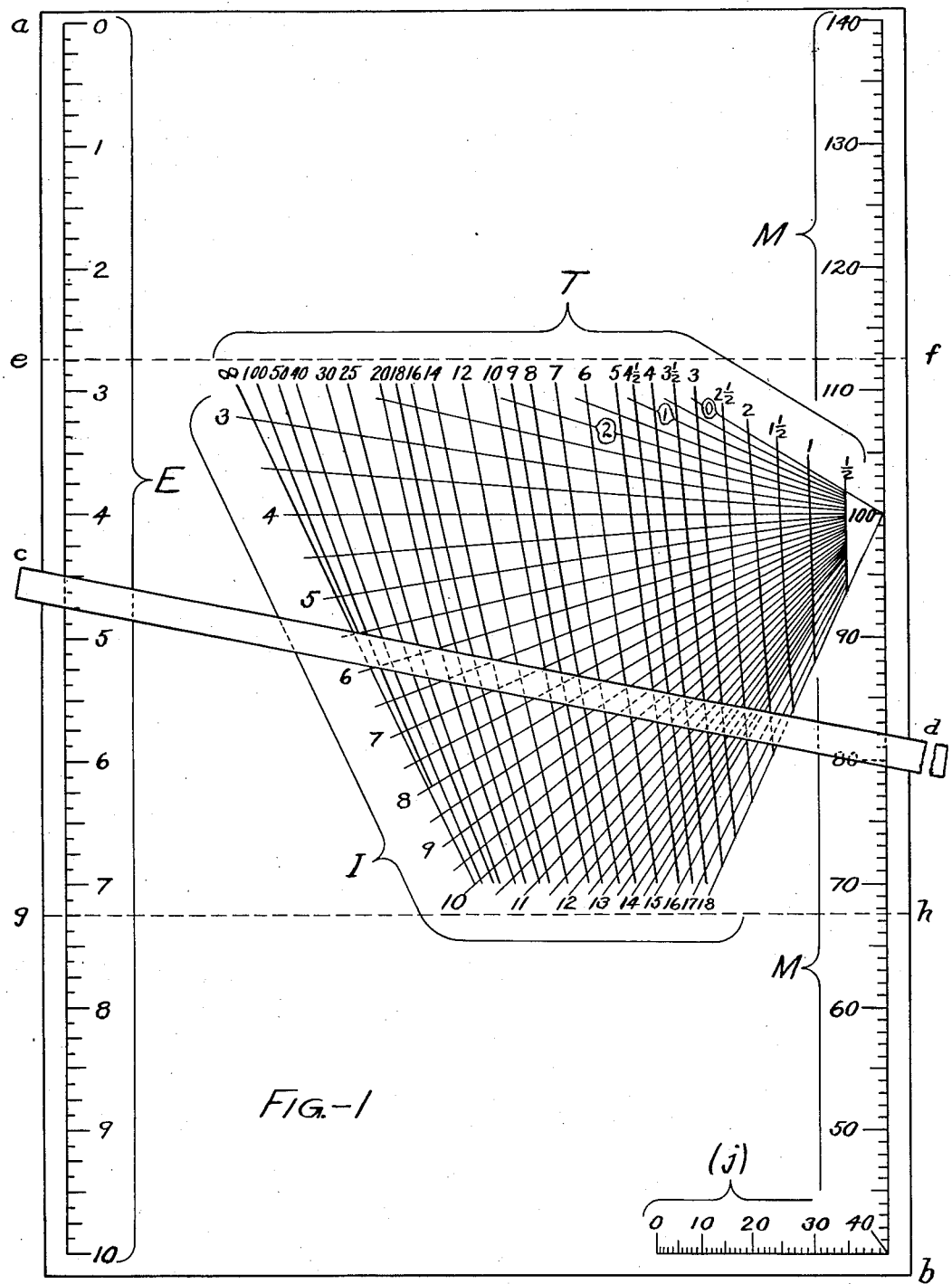
Figure 2:
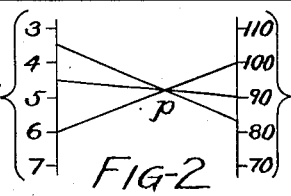

In the drawings Figure 1 is a general plan view of an embodiment of my invention, and Fig. 2 is a diagram that will be referred to in explaining the principle of the device.

Referring to Fig. 1, $ab$ is a rectangular sheet of paper with a uniform scale of values for E at the left ranging from 0 to 10, as shown, and at the right a parallel uniform scale of values for M ranging from 40 to 140 as shown. From the point designated "100" on the M scale, lines radiate toward the division points of the E scale and the ends of these radiating lines are numbered to correspond to the points of the E scale toward which they are directed. These numbers, running from 3 to 18, constitute an I scale. The numbers 0, 1 and 2 properly belonging to this scale will be found on the corresponding lines. Extending across the I lines are curves, each curve corresponding to a time T in years. These curves are numbered at their upper ends from $\frac{1}{2}$ to 100 and $\infty$ and these numbers form a T scale. How the T curves are constructed will be explained presently. As will be shown, they are based on the assumption that interest shall be compounded semi-annually. Lying across the sheet $ab$ is a straight-edge $cd$ of transparent celluloid.

The intersecting I lines and T curves are kept within the space between the two dotted lines $ef$ and $gh$ located as shown; thus when not in use, the paper sheet $ab$ can be folded along said dotted lines without creasing any part of the sheet containing the intersecting I lines and T curves.

To illustrate the use of the device, let it be assumed that the market price of a $4\frac{1}{2}$ per cent. bond is 82 and that it matures in 10 years; what is the income rate? Place the straight-edge $cd$ so that it will cross the $4\frac{1}{2}$ point on the E scale and the 82 point on the M scale, and note the point where the straight-edge $cd$ crosses the T curve marked 10. This point is very near the I line marked 7 and therefore the income rate is about 7. Actually, as may be determined by careful logarithmic computation, the said point is a trifle below the I line marked 7 and the income rate is more nearly 7.04.

Again, let it be supposed that the market price is 82, expressed rate $4\frac{1}{2}$ and time to maturity 25 years. It will be seen that the straight-edge intersects the T curve 25 somewhat above the I line 6, hence the income rate I is less than 6. Interpolating by the eye it is seen to be about $5\frac{7}{8}$. By logarithmic computation the rate is more nearly 5.884.

Again, let it be supposed that the expressed rate is $4\frac{1}{2}$, time to maturity 8 years, and it is desired to know what market price will give an income of 7½ per cent. Find the intersection of the T-curve 8 and the I-line 7½; place the straight-edge on this point and on the 4½ point of the E-scale, then the straight-edge will cross the M-scale at the point designated as required, namely about 82. By logarithmic computation the result is more nearly 82.19.

The formula that relates the four quantities M, I, E and T may be established as follows. Equating M to the present worth of the deferred payments, both interest and principal, $$M = \frac{E/2}{1+\frac{I}{200}} + \frac{E/2}{\left(1+\frac{I}{200}\right)^2} + \cdots + \frac{E/2}{\left(1+\frac{I}{200}\right)^{2T}} + \frac{100}{\left(1+\frac{I}{200}\right)^{2T}}$$

The terms of the right hand member, except the last, form a geometrical progression. Summing them, the equation reduces to the fundamental formula to be proved, namely $$\left(1+\frac{I}{200}\right)^{2T} = \frac{100\ I - 100\ E}{MI - 100\ E}$$

Let T and I have constant values, then the first member of the foregoing equation is constant. Call it K. Then $$K = \frac{100\ I - 100\ E}{MI - 100\ E}$$

whence $$E = \frac{KMI - 100\ I}{100\ (K-1)}$$

Let $\triangle E$ and $\triangle M$ be corresponding increments of E and M respectively. It follows that $$\triangle E = \frac{KI}{100\ (K-1)} \triangle M$$

whence it appears that with T and I constant, any variation in M is accompanied by a proportional variation of E. Hence, having given the two parallel scales for E and M as shown in Fig. 2, if corresponding values of E and M are joined by straight lines, these straight lines will all pass through a point $p$. Since this point is the same for all corresponding values of E and M (T and I being constant), the point will be the same when M=100 and when in consequence E=I. Hence for a given value of I the point lies on the line from the 100 point on the M-scale to the point expressing that value of I on the E-scale. Thus the I-lines of Fig. 1 are determined.

Any particular T-curve, as for example the curve for T=6, may be established thus. Assign a convenient value for E, say 5. Assign a series of values for I, as 3, 4, 5, etc. In the fundamental formula substitute T=6, E=5, and in succession the values for I, namely 3, 4, 5, etc., then the formula gives the corresponding values for M which may be designated $M_3$, $M_4$, $M_5$, etc. Place the straight-edge at the 5 point on the E-scale and at the value $M_3$ on the M-scale and note where it crosses the previously established the T-curve 6. Similarly for other points on that curve and for other T-curves. The curvature of the T-curves is relatively slight so that anyone of them can be drawn very accurately through a series of predetermined points.

The T-curve for T=∞ is a straight line which if prolonged will cross the E and M scales at the zero point of each scale. This corresponds to a stock with a fixed dividend rate. Hence, for stocks, this line for ∞T= may be used. Thus if a stock paying a 4½ per cent. dividend sells at 82, the income rate will be found as a trifle less than 5½ per cent.

Problems in "present worth" may be solved by placing the straight edge at the zero point on the E-scale. Thus the present worth of $100.00 in 12 years, reckoning interest at 6% compounded semi-annually, is a little over $49.00, more accurately $49.19. For problems in present worth only, the M-scale is extended as at $j$. The points of the scale $j$ are determined by prolonging the M-scale downwardly and then projecting its points toward the zero point of the E-scale.

Heretofore it has been common for investors and security dealers to use books of tables for determining such valuations as are here considered. Such a book will have one hundred or more pages, and the successive values of E and I will often differ by as much as ½ per cent. Also the successive values of M will often differ by several units, so that interpolation is necessary to get accurate results. Furthermore the range of such tables seldom goes as low as 2½% or as high as 8%. To give the range of my device in printed tables would make them very bulky. To interpolate by the eye on the scales or between the lines or curves is quicker than interpolating in tables. Engineers commonly "estimate tenths" of the smallest scale divisions and a similar practice with my device gives fairly accurate results. One advantage of my device is that it makes comparison easy between various sets of data. For example, it shows at a glance that it makes very little difference line 3 of the I-lines; this point is a point on on a bond of high expressed interest rate whether it has 40 or 50 years to run till maturity. Similarly the device shows that for bonds running 50 years or more, there is very little difference from a stock with a definite assured dividend.

In the following claims, the term "curve" is sometimes used in the generic sense common with mathematicians to include straight lines as a special case. Thus the radiating I-lines of Fig. 1 would be comprehended by the expression "a set of curves".

I claim:

1. In a device for computing security valuations, a plane surface with two straight graduated scales thereon, one for the expressed rate of interest, the other for the market value, and two sets of intersecting curves on said surface, one set corresponding to different income rates of interest and the other set corresponding to different periods of time to maturity of the security, and in combination therewith a straight-edge lying across said plane surface to coöperate with said scales and sets of curves.

2. In a device for computing security valuations, a plane surface with two straight graduated scales thereon, one for the expressed rate of interest, the other for the market value, a set of straight lines radiating from the par point of the scale of market values toward the division points of the other scale, said radiating lines corresponding to different income rates of interest, and a set of curves intersecting said lines, said curves corresponding to different periods of time to maturity of the security, and in combination therewith a straight-edge lying across said plane surface to coöperate with said scales and sets of curves.

3. In a device for computing security valuations, a plane surface with two straight graduated scales thereon, one for the expressed rate of interest, the other for the market value, a set of straight lines radiating from the par point of the scale of market values toward the division points of the other scale, said radiating lines corresponding to different income rates of interest, and a set of curves intersecting said lines, said curves corresponding to different periods of time to maturity of the security, and in combination therewith a straight-edge lying across said plane surface to coöperate with said scales and sets of curves, each such curve intersecting each radiating line at a point so that the following four values belong together consistently, namely, the income rate corresponding to that line and the time corresponding to that curve and any two values on the two scales at points thereof in alinement with the intersection.

4. In a device for computing security valuations, a rectangular sheet of paper with two straight graduated scales close to the side edges of the sheet, one scale for the expressed rate of interest, the other for the market value, and two sets of intersecting curves on said sheet between said scales and restricted to the middle part of the length of the sheet whereby the ends of said sheet can be folded over the middle portion without creasing said curves, one set of said curves corresponding to different income rates of interest and the other set corresponding to different periods of time to maturity of the security, and in combination with said sheet a straight edge to coöperate with said scales and sets of curves.

In testimony whereof, I have subscribed my name.

CARL A. RICHMOND.

---

Copies of this patent may be obtained for five cents each, by addressing the "Commissioner of Patents, Washington, D. C."

It is hereby certified that in Letters Patent No. 1,157,043, granted October 19, 1915, upon the application of Carl A. Richmond, of Tyngsboro, Massachusetts, for an improvement in "Devices for Computing Valuations of Investment Securities," errors appear in the printed specification requiring correction as follows: Page 2, line 64, after the word "established" insert the words *line 3 of the I-lines; this point is a point on;* same page, line 76, for the symbol "$\infty T=$" read "$T=\infty$"; same page, strike out line 114; and that the said Letters Patent should be read with these corrections therein that the same may conform to the record of the case in the Patent Office.

Signed and sealed this 9th day of November, A. D., 1915.

[SEAL.]

J. T. NEWTON,

*Acting Commissioner of Patents.*